March 26, 1963  P. G. K. SMITHERS  3,082,464
WINDSCREEN WIPERS
Filed Oct. 16, 1959  2 Sheets-Sheet 1
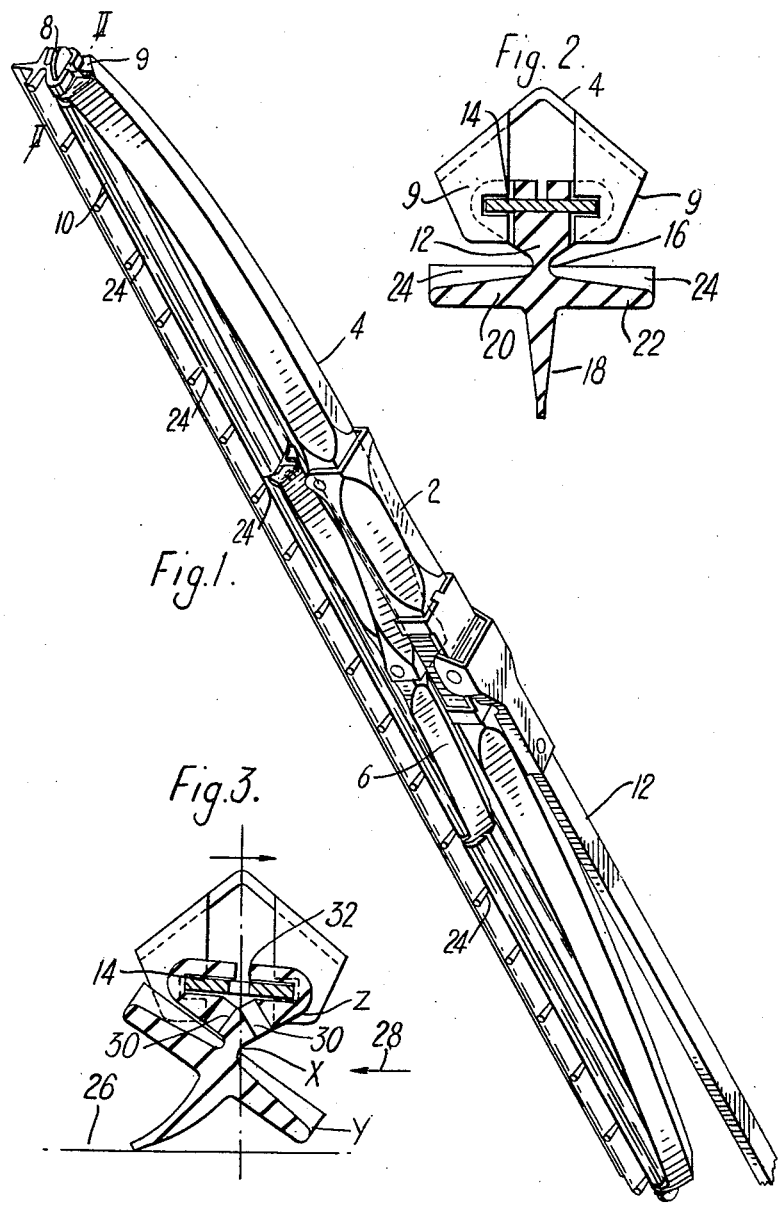
Inventor
PHILLIP GEOFFREY KENT SMITHERS
By Ralph J. Barrett
Attorney

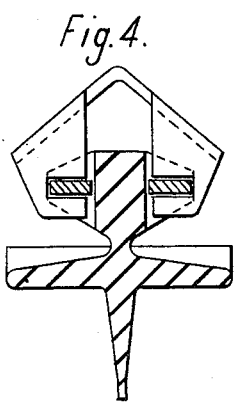
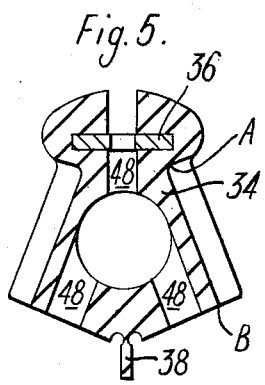
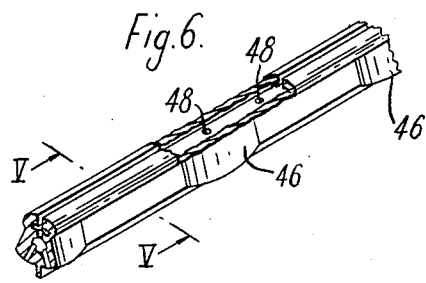
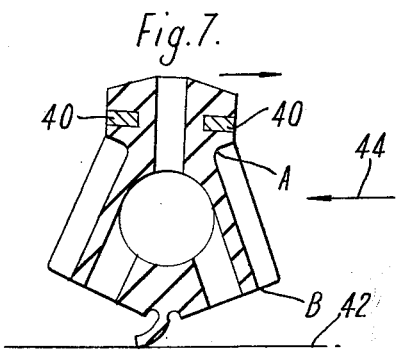

United States Patent Office 3,082,464
Patented Mar. 26, 1963

3,082,464
WINDSCREEN WIPERS
Phillip Geoffrey Kent Smithers, Ealing, England, assignor to Trico Products Corporation, Buffalo, N.Y., a corporation of New York
Filed Oct. 16, 1959, Ser. No. 846,825
8 Claims. (Cl. 15—250.42)

The present invention is concerned with windscreen wipers having a blade of rubber or equivalent material (which will be termed a "rubber") which, when in use, is dragged across a windscreen by a harness carried by a wiper arm on an oscillating shaft.

According to the present invention a rubber has a single wiping lip on a plane of symmetry when unstressed, and the shape of the rubber, and the manner of connection between the harness and the rubber, is such that when the harness is held in an upright position with respect to a windscreen and is drawn across the screen and towards an observer, with the wiping lip firmly in contact with the windscreen but with no other part of the rubber touching the windscreen, the observer will see a face on the rubber which slopes away from the windscreen and from the observer and lies between the windscreen and the plane of the backing strip, and of which the actual area is greater than the effective areas of surfaces of the rubber which can be seen by the observer and which slope towards the windscreen and away from the observer.

Wipers according to the present invention are less prone than existing wipers to be lifted off a windscreen by the force of wind when a vehicle is travelling at high speed. The angles and areas of the various surfaces of a rubber influence the air flow, but the effect is not susceptible to simple or precise analysis. The face sloping away from both the windscreen and the observer is acted on by wind to provide a force urging the rubber towards the windscreen. This face should accordingly be as large as possible and should lie at an angle to the windscreen which gives the greatest practical force without resulting in a rubber which is so wide as to obscure the view through the windscreen unnecessarily and to need an excessive amount of material.

The effective areas of surfaces of the rubber which can be seen by the observer and which slope towards the windscreen and away from the observer should be as small as possible, since wind acting on them tends to lift the rubber away from a windscreen. The expression "effective areas" includes imaginary areas bridging depressions, but excludes such imaginary areas or actual areas lying close to and substantially parallel to the windscreen, since those areas lie in the boundary layer of flow close to the windscreen and are therefore not greatly influenced by wind.

A further consideration in the design of rubbers according to the present invention is that there should not be any substantial area of the rubber on the side remote from the observer on which air pressure would produce a force tending to rock the rubber towards the observer. The reason for this is that rocking would be liable to precipitate the rubber lifting from the windscreen.

The backing strip may be attached to the harness with substantially no play, or the arrangement may be such that the backing strip is capable of rocking through a predetermined small angle with respect to the harness to each side of a central position.

In one form of construction according to the present invention the rubber consists of a substantially rigid body which engages the backing strip with substantially no play, and a relatively shallow wiping lip. At least half of the extent of each side of the body between the backing strip and the end of the wiping lip, as seen in cross section, is defined by a line which extends from close to the backing strip and slopes away from the line of symmetry of the rubber. The surface containing this line is that which slopes away from both the observer and the windscreen when the rubber is drawn across a windscreen.

The line defining at least half the depth is preferably substantially straight and is preferably inclined to the line of symmetry of the body of the rubber by between 15° and 45°. These limits of angle are practical demarcations between angles which are too small to give rise to any substantial lift-resisting force and angles which are so large that the blade obscures the view through the windscreen unnecessarily and uses an excessive amount of rubber.

The shape of the body between the root of the wiping lip and the end of the straight line remote from the head is conveniently defined by a second substantially straight line. This second straight line must be inclined away from the windscreen, for the body of the rubber would otherwise engage the windscreen, especially when the rubber is used on a windscreen which is curved in a horizontal plane. In practice the angle between the straight line and the line of symmetry of the rubber is made not greater than 80° C.

In a different form of construction according to the present invention the rubber consists of a head which engages the backing strip with substantially no play, and a body which is joined to the head by a flexible neck and has a central wiping lip and two lateral flanges which by engagement with the head limit the angle through which the neck can flex. The face which slopes away from the observer and from the windscreen when the rubber is drawn across a screen is the upper surface of one of the lateral flanges.

The arrangement is preferably such that, when one lateral flange engages the head, the face of the other flange remote from the wiping lip slopes inwards and towards the head at an angle of between 30° and 55° to the plane of symmetry of the head.

In all constructions according to the present invention the face sloping away from both the observer and the windscreen when the rubber is drawn across a windscreen is preferably interrupted at longitudinal intervals by ribs or notches, or is slightly undulating in form along its length and has sharp crests. This has the desirable effect of reducing longitudinal flow along the rubber, which tends to create vortices at the ends of the rubber and to make the rubber more prone to lift away from the windscreen. Moreover, this slightly increases the force urging the rubber towards the windscreen.

There are preferably, at intervals along the rubber, holes leading from the side of the rubber remote from the wiping lip to any surface which slopes towards the windscreen and away from the observer when the rubber is drawn across a windscreen towards an observer. Such holes slightly reduce the effect of wind tending to lift a rubber away from the windscreen.

Examples of constructions according to the present invention are shown in the accompanying drawings. In these drawings:

FIGURE 1 is a perspective view of a harness with one form of rubber;

FIGURE 2 is a diagrammatic sectional view of the line II—II in FIGURE 1;

FIGURE 3 is similar to FIGURE 2 but is a sectional view in a different position and shows the rubber in the attitude which it takes up when wiping;

FIGURE 4 is similar to FIGURE 2 but shows a second or modified form of rubber;

FIGURE 5 is a sectional view on the line V—V in FIGURE 6 of a third form of rubber with a backing strip;

FIGURE 6 is a fragmentary perspective view of the rubber shown in FIGURE 5; and

FIGURE 7 is a sectional view of a fourth form of rubber with a backing strip and shows the rubber in a wiping attitude.

The harness shown in FIGURE 1 consists of yokes 2, 4 and 6 which are pivoted together and have their free ends connected to a backing strip 8 in a rubber 10 by means of knife-edge claws 9 (see FIGURE 2). The yoke 2 is connected to a wiper arm 12 (partly shown).

As shown in FIGURE 2, the rubber consists of a head 12 containing a backing strip 14 and joined by a neck 16 to a body below the neck. The body has a central downward wiping lip 18 and lateral flanges 20 and 22. These flanges limit the angle through which the neck can flex, by engagement with the head. In the example shown the angle is about 35°. The top surfaces of the flanges are formed at longitudinal intervals with ribs 24 to reduce the longitudinal flow of air along them during wiping. Flexing of the neck is actually limited by engagement of these ribs with the head.

FIGURE 3 shows the attitude taken up by the rubber and the backing strip when the wiper is operating on a surface 26 with the harness in an upright position with respect to the surface 26, the movement being from the left to the right. An observer viewing the rubber in the direction of an arrow 28 sees a face on the rubber lying, as seen in cross section, between points X and Y. This face is inclined away from the windscreen and from the observer and is of greater area than the surface lying between the points X and Z, this latter surface being the only other surface which has any effect and which is inclined towards the windscreen and away from the observer. The part of the rubber between the point Y and the windscreen is of no consequence since a line joining the point Y and the end of the wiping lip lies close to and substantially parallel to the surface 26 and lies therefore in the boundary layer of flow, which is so slow as to have little effect. In the attitude shown the surface between the points X and Y can be seen to slope inwards and towards a head at an angle of 42° to the plane of symmetry of the head. Owing to slackness in the connection between the claws and the backing strip, the backing strip lies at an angle of about 3° to the harness; this has the advantage that at the end of a stroke of the wiper, the backing strip snaps through about 6° and assists the body of the rubber to rock into its appropriate opposite position for the following stroke.

The rubber has, at intervals along its length, holes 30 leading to holes 32 (see FIG. 3) in the backing strip and hence communicating with the top surface of the rubber. This gives rise to a venturi effect which decreases the pressure on the first surfaces.

The rubber shown in FIGURE 4 is the same as that shown in FIGURE 2 except that the backing strip is in the form of two pieces lying in slots in the head of the rubber.

The rubber shown in FIGURE 5 consists of a substantially rigid body portion 34 which engages a backing strip 36, lying in a slot in a head portion of the body and gripped by flanges on the body, with substantially no play, and a relatively shallow wiping lip 38. Well over half of the extent of each side of the body between the backing strip and the wiping lip, as seen in FIGURE 5, is defined by a line connecting the points A and B and sloping away from the plane of symmetry of the rubber at an angle of 21°. When in use the backing strip is connected to a harness with as little play as possible, so that the backing strip is substantially parallel to the windscreen when the wiper is operating with the harness upright.

FIGURE 7 shows the attitude of a rubber similar to that shown in FIGURE 5 (except that the backing strip is in the form of two pieces 40) when wiping a surface 42. An observer viewing the rubber in the direction of an arrow 44 would see, in addition to the surface between the points A and B, a surface between the point B and the end of the wiping lip. This second surface is of smaller area than the first surface.

In order to reduce longitudinal flow the rubber is formed at intervals with shallow crests or rounded ribs 46.

The rubber has a longitudinal bore into which three sets of holes 48 extend at intervals along the length of the rubber to reduce the pressure on the lower surfaces of the rubber.

I claim:

1. A windscreen wiper comprising a wiper harness and an elongate wiper rubber connected to the harness through a surface-conforming backing strip, said rubber having a head portion supported by the backing strip and said harness having yoke means with claw means operatively engaging portions of the strip at longitudinally spaced points for stroking the wiper back and forth, said head portion having an attached body portion from which suspends a laterally flexible wiping lip, said body portion having side face areas of greater lateral extent than the backing strip and acting to present a wind-reacting sloping face alternately during the stroking of the rubber to react in a force toward the windscreen for increasing the downward pressure in the lip contact therewith, the actual area of each sloping side face being greater than the effective lifting areas of other wind-receiving surfaces of the rubber when the wiper is moving back and forth on the windscreen, whereby the force of the oncoming wind upon the forward one of the side face areas will dominate the wind force applied to the effective areas toward the maintenance of the lip contact and a reduction in the windlift action of the wiping lip.

2. A windscreen wiper comprising a wiper harness and an elongate wiper rubber connected to the harness through a flexible surface-conforming backing strip, said rubber having a head portion supported by the backing strip and said harness having yoke means with claw means operatively engaging the opposite longitudinal marginal portions of the strip at longitudinally spaced points for stroking the wiper sideways back and forth, said head portion having a depending body portion which suspends a relatively shallow and laterally flexible wiping lip, said body portion having oppositely sloping side face areas diverging toward the windscreen surface and presenting downwardly and outwardly inclining wind-reacting faces on opposite sides of the rubber to divert the force of the oncoming wind in a direction toward the windscreen surface for increasing the pressure in the lip-contact on the windscreen against wind-lifting of the lip, such pressure dominating a contrary wind force on the effective areas of other wind-receiving surfaces of the rubber when the wiper is moving back and forth on the windscreen, whereby the force of the oncoming wind upon the forward one of the side face areas will serve toward the maintenance of the lip contact.

3. A windscreen wiper comprising a wiper harness and a wiper rubber connected to the harness through a surface-conforming backing strip, said rubber having a head portion supported by the backing strip and said harness having yoke means with knife edge claws operatively engaging longitudinal marginal portions of the strip at longitudinally spaced areas for stroking the rubber back and forth, said head portion having flex-limiting underfaces downwardly converging to a reduced neck that flexibly suspends a lip-carrying body portion with oppositely extending wind reactive flanges one on each side thereof below but adjacent the reduced neck, the lateral extent of said flanges being greater than that of the harness yoke means and the forward flange being operable to shield the advancing side of the lip-carrying body portion from the force of the wind to reduce the wind-lifting effect on the wiping lip, the trailing one of said flanges being alternately arrestable by the respective one of the flex-limiting underfaces of the head to afford support to the forward flange from contacting the windscreen, and said flanges together with the wiping lip being laterally rockable as a unit on the neck to assist in holding the forward flange depressed for so shielding the wiping lip from wind lift.

4. A combination according to claim 1 in which the rubber consists of a head portion which engages the backing strip with substantially no play, and a body portion which is joined to the head portion by a flexible neck, the body portion having a central wiping lip and two lateral flanges which by engagement with the head portion limit the angle through which the neck can flex, each side face area sloping away from the observer and from the windscreen when the rubber is drawn across a screen being the upper surface of one of the lateral flanges.

5. A combination according to claim 4 in which the amount of flexing permitted to the neck is about 38° on each side of the central position.

6. A combination according to claim 4 in which, when one lateral flange engages the head portion, the face of the other flange remote from the wiping lip slopes inwards and towards the head portion at an angle of between 30° and 55° to the plane of symmetry of the head portion.

7. A combination according to claim 1 in which the face sloping away both from the observer and the windscreen has crests at longitudinal intervals in order to retard airflow in a longitudinal direction close to the surface.

8. A combination according to claim 1 including, at longitudinal intervals along the rubber, holes leading from the side of the rubber remote from the wiping lip to a top surface which slopes towards the windscreen and away from the observer when the rubber is drawn across a windscreen towards an observer, said holes acting to decrease the pressure on the lower surfaces of the rubber.

References Cited in the file of this patent

UNITED STATES PATENTS

| | | |
|---|---|---|
| 2,543,383 | Scinta et al. | Feb. 27, 1951 |
| 2,550,504 | Vidrick et al. | Apr. 24, 1951 |
| 2,702,397 | Oishei | Feb. 22, 1955 |
| 2,741,791 | Scinta | Apr. 17, 1956 |
| 2,782,444 | Krohm | Feb. 26, 1957 |
| 2,814,821 | Wallis | Dec. 3, 1957 |
| 2,834,976 | Oishei | May 20, 1958 |

FOREIGN PATENTS

| | | |
|---|---|---|
| 583,367 | Germany | Sept. 1, 1933 |